April 15, 1958 W. SMEULERS 2,831,112
CIRCUIT ARRANGEMENT FOR SYNCHRONIZING A MULTIVIBRATOR
Filed Feb. 5, 1954
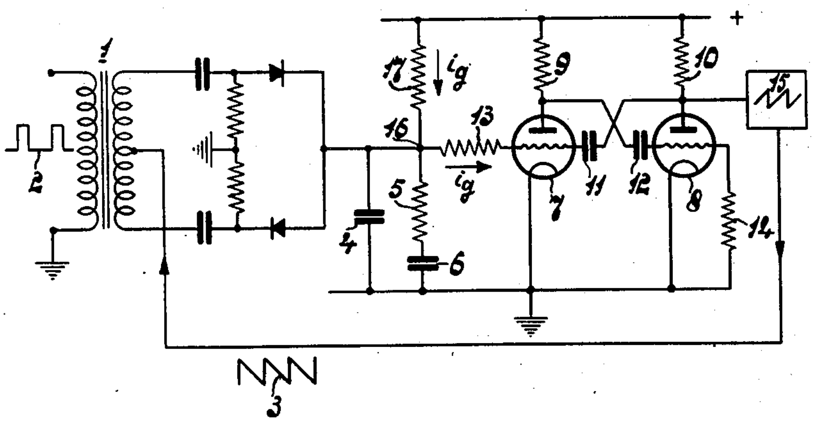
INVENTOR
WOUTER SMEULERS
BY [signature]
AGENT Patented Apr. 15, 1958

2,831,112

CIRCUIT ARRANGEMENT FOR SYNCHRONIZING A MULTIVIBRATOR

Wouter Smeulers, Eindhoven, Netherlands, assignor, by mesne assignments, to North American Philips Company, Inc., New York, N. Y., a corporation of Delaware Application February 5, 1954, Serial No. 408,513

Claims priority, application Belgium February 20, 1953

1 Claim. (Cl. 250—36)

The invention relates to a circuit arrangement for synchronizing by means of a control direct voltage generated by a push-pull discriminator, a multivibrator arrangement comprising two tubes, the anode of one tube being capacitatively coupled to the control grid of the other tube and vice versa, grid leak resistors being included in the control grid circuits of both tubes. The control direct voltage is a variable direct voltage which controls the frequency of the multivibrator.

Such circuit arrangements are used, for example, in television receivers, a saw-tooth-shaped potential being derived from the multivibrator circuit for controlling the saw-tooth-shaped current in one of the deflection devices of the cathode ray tube.

In this case the multivibrator has a control potential supplied to it which is governed by the phase difference between the received synchronising pulses and a voltage derived from the deflection device, which voltage may be saw-tooth-shaped.

As will be seen hereinafter, in this case there is a limitation in that it is undesirable for this control direct voltage to be supplied without further expedients to the control grid of one of the tubes of the multivibrator arrangement. Therefore usually a control voltage is generated which does not vary in the desired sense but varies in the opposite sense with variation of the phase difference between the synchronising pulses and the generated sawtooth oscillation.

This oppositely varying control voltage is thereupon supplied to the control grid of a tube of the multivibrator through a direct current amplifier acting as a phase inverter tube.

The circuit arrangement according to the invention, which eliminates the use of the direct current amplifier required in previously known circuits, is characterized in that the control direct voltage is supplied to the remote end of the grid leak resistor which is connected to the control grid of one of the multivibrator tubes and this end is connected through a resistor to a point of constant potential in a manner such that the current passing through the last-mentioned resistor is substantially equal to the mean grid current drawn by the last-mentioned control grid, thereby preventing this grid current from undesirably passing through the source of control voltage.

The invention will now be described with reference to the accompanying drawing, in the single figure of which an embodiment thereof is shown by way of example.

Referring now to the figure, a push-pull discriminator contains an input transformer 1 to the primary winding of which the received synchronising pulses 2 are supplied. The secondary winding has connected to it a series combination of a capacitor, a rectifier, a second rectifier symmetrically connected in the series combination and a second capacitor. A resistor the centre-tap of which is earthed is connected in parallel with the rectifiers.

Between this earthed centre-tap and a centre-tap on the secondary winding of the transformer 1 a saw-tooth-shaped control voltage 3 is supplied.

The control direct voltage is derived from a smoothing network which consists of the parallel combination of a capacitor 4 and a second branch comprising the series combination of a resistor 5 and a capacitor 6.

The operation of the push-pull discriminator which is herein described superficially is well known, a further explanation being immaterial to an understanding of the circuit arrangement according to the invention.

By means of the control direct voltage the frequency of a multivibrator arrangement must now be controlled. This multivibrator arrangement also is of a known kind. It comprises two tubes 7 and 8 comprising anode resistors 9 and 10 respectively. The anodes of the tubes are capacitively coupled crosswise to the control grids of the tubes through capacitors 11 and 12.

The control grid of the tube 7 is connected to a grid leak resistor 13 and the control grid of the tube 8 to a grid leak resistor 14.

At the anode of the tube 8 a pulsatory voltage is set up by means of which a saw-tooth-shaped output voltage is obtained from which a saw-tooth-shaped current is derived in the deflection device. This part of the arrangement shown at 15 is also fully known. From the device 15 the saw-tooth-shaped control voltage 3 supplied to the push-pull discriminator is derived.

The invention is a new and improved solution of the problem as to how the control direct voltage should be supplied to the control grid of the tube 7.

As is well known, in a multivibrator of the kind described current flows to the control grid of the tube 7 for part of the period of the vibration of the multivibrator. Consequently the mean grid current, which will be designated $i_g$, passes through the grid leak resistor 13.

If now one proceeds in accordance with the hitherto described part of the arrangement, the said mean grid current $i_g$ must be passed by one of the rectifiers of the push-pull discriminator. However, this results in the loss of the greater part of the push-pull action of the discriminator with resultant loss of the insensitiveness to disturbances of the synchronisation of the multivibrator.

According to the invention, however, an end 16 of the grid leak resistor 13 which is remote from the control grid is connected through a resistor 17 to a point of constant potential, for example the positive terminal of the anode supply. The resistor 17 is in this case dimensioned such that it passes a current which is substantially equal to the mean grid current $i_g$, and thus provides a path for the grid current of tube 7.

Consequently the grid current of the tube 7 is substantially no longer conducted through a rectifier of the push-pull discriminator and the push-pull action is no longer adversely affected.

What is claimed is:

A synchronizing circuit comprising a multivibrator having a tube containing a control grid which draws grid current, a push-pull discriminator having an output terminal and connected to provide at said output terminal a control voltage for said multivibrator, a grid leak resistor connected directly between said output terminal and said control grid, a source of constant potential, and a resistor connected between said source of constant potential and said output terminal, said last-named resistor having a resistance value to cause an amount of current to flow from said source through said last-named resistor which is equal to the mean value of current drawn by said control grid, whereby substantially none of the current drawn by said control grid flows through said discriminator.

References Cited in the file of this patent

UNITED STATES PATENTS 2,610,298 Zaloudek ---------------- Sept. 9, 1952

OTHER REFERENCES

"Modern Television Receivers" in Radio and Television News, pages 43–46, February 1950.

Rider Television Manual, volume 8, Model 317TM Stromberg-Carlson TV, pages 8–7.